US006982835B2

(12) United States Patent
Tomioka (10) Patent No.: US 6,982,835 B2
(45) Date of Patent: Jan. 3, 2006

(54) FOUR-GROUP ZOOM LENS

(75) Inventor: Ukyo Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 33 days.

(21) Appl. No.: 10/766,809

(22) Filed: Jan. 30, 2004

(65) Prior Publication Data
US 2004/0184159 A1 Sep. 23, 2004

(30) Foreign Application Priority Data
Feb. 5, 2003 (JP) ............................. 2003-028495

(51) Int. Cl.
*G02B 15/14* (2006.01)
(52) U.S. Cl. ..................................... 359/687; 359/683
(58) Field of Classification Search ................ 359/687, 359/683
See application file for complete search history.

(56) References Cited
U.S. PATENT DOCUMENTS
5,583,699 A * 12/1996 Nakayama .................. 359/687
5,886,828 A * 3/1999 Kim ............................ 359/687
6,404,561 B1 6/2002 Isono et al. .................. 359/683

* cited by examiner

*Primary Examiner*—Scott J. Sugarman
(74) *Attorney, Agent, or Firm*—Arnold International; Jon W. Henry; Bruce Y. Arnold (57) ABSTRACT

A four-group zoom lens that corrects aberrations in the visible and near infrared regions includes, in order from the object side, a first lens group of positive refractive power, a second lens group of negative refractive power, and third and fourth lens groups, each of positive refractive power. Only the second and fourth lens groups move during zooming. The first lens group includes a negative lens element on the object side of second, third, and fourth lens elements that each have positive refractive power and a convex lens surface on the object side. Aspheric lens surfaces are disclosed. Certain conditions are satisfied by the ratio of focal lengths of the first lens group and the zoom lens, and, in the first lens group, by the Abbe numbers of the first and second lens elements and the index of refraction of the second lens element.

12 Claims, 5 Drawing Sheets

Spherical Aberration
Fig. 3A

Astigmatism
Fig. 3B

Distortion
Fig. 3C

Spherical Aberration
Fig. 4A

Astigmatism
Fig. 4B

Distortion
Fig. 4C

Spherical Aberration
Fig. 5A

Astigmatism
Fig. 5B

Distortion
Fig. 5C

Spherical Aberration
Fig. 6A

Astigmatism
Fig. 6B

Distortion
Fig. 6C

Spherical Aberration
Fig. 7A

Astigmatism
Fig. 7B

Distortion
Fig. 7C

Spherical Aberration
Fig. 8A

Astigmatism
Fig. 8B

Distortion
Fig. 8C

FOUR-GROUP ZOOM LENS

BACKGROUND OF THE INVENTION

Cameras for both day and night use have been developed for surveillance imaging. Additionally, the demand for lenses that operate in both the visible light region and the near infrared region for use both during the day and at night have been increasing. A great many zoom lenses have been designed for use in the visible light region. For example, a zoom lens for use in the visible light region is described in Japanese Laid-Open Patent Application 2001-194590. The lens described in this application is a four-group zoom lens with a zoom ratio of about ten to one.

However, conventional lenses that are designed for use only in the visible light region include chromatic aberrations in the images they produce that are large in the near infrared region. This causes the images to be not clearly focused when using the near infrared region for imaging at night. For this reason, a lens that favorably corrects aberrations in both the visible light region and the near infrared region is desired. In addition, particularly bright lens systems are desirable in surveillance cameras, especially for imaging at night. Furthermore, a zoom lens that can realize a ten to one zoom ratio in both the visible light region and in the near infrared region is desirable in order to comply with the various needs of the users.

BRIEF SUMMARY OF THE INVENTION

The present invention is a four-group zoom lens that provides comparatively bright imaging and that favorably corrects aberrations in both the visible light region and the near infrared region. The present invention is particularly suited for surveillance imaging.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
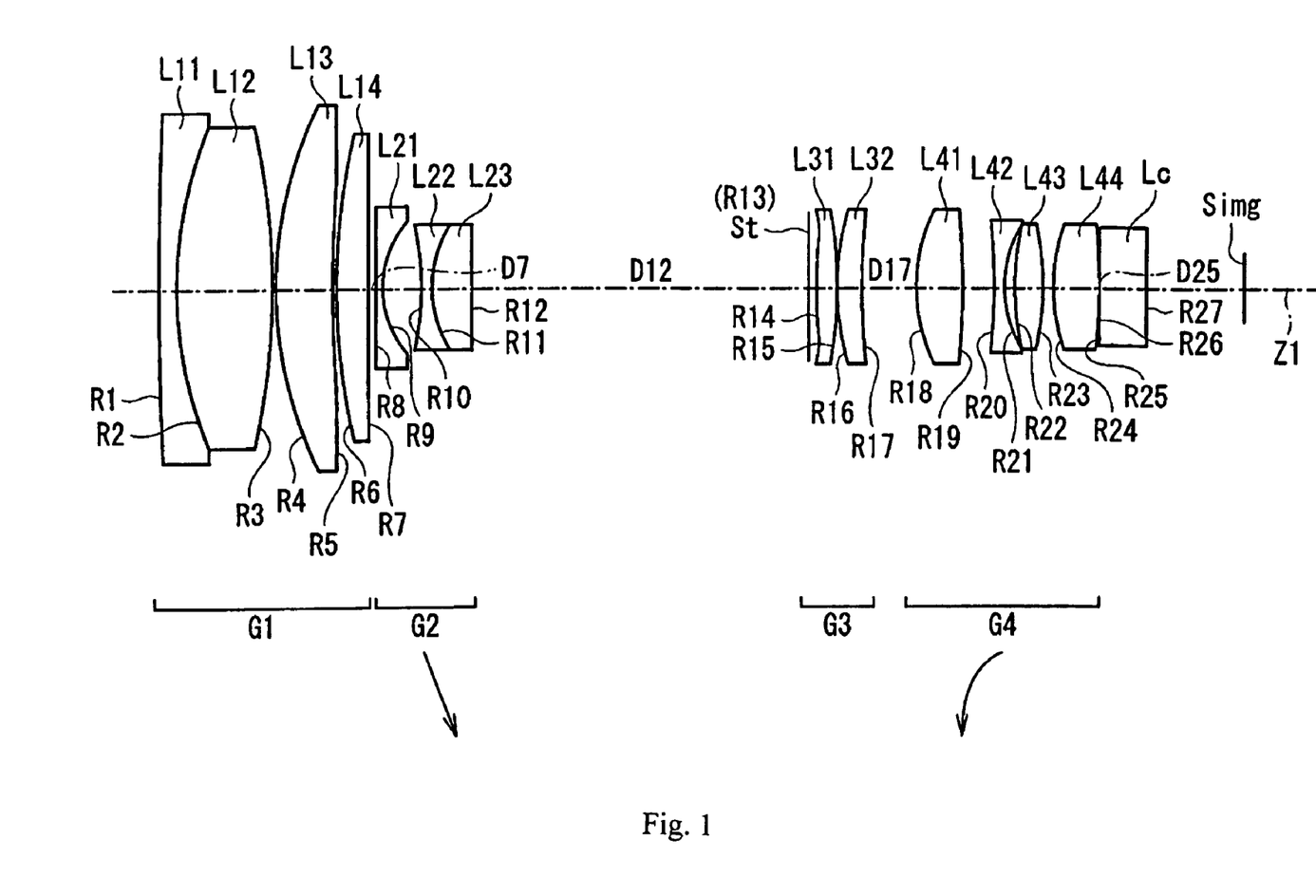
FIG. 1 shows a cross-sectional view of Embodiment 1 of the zoom lens of the present invention at the wide-angle end.
Figure 2:
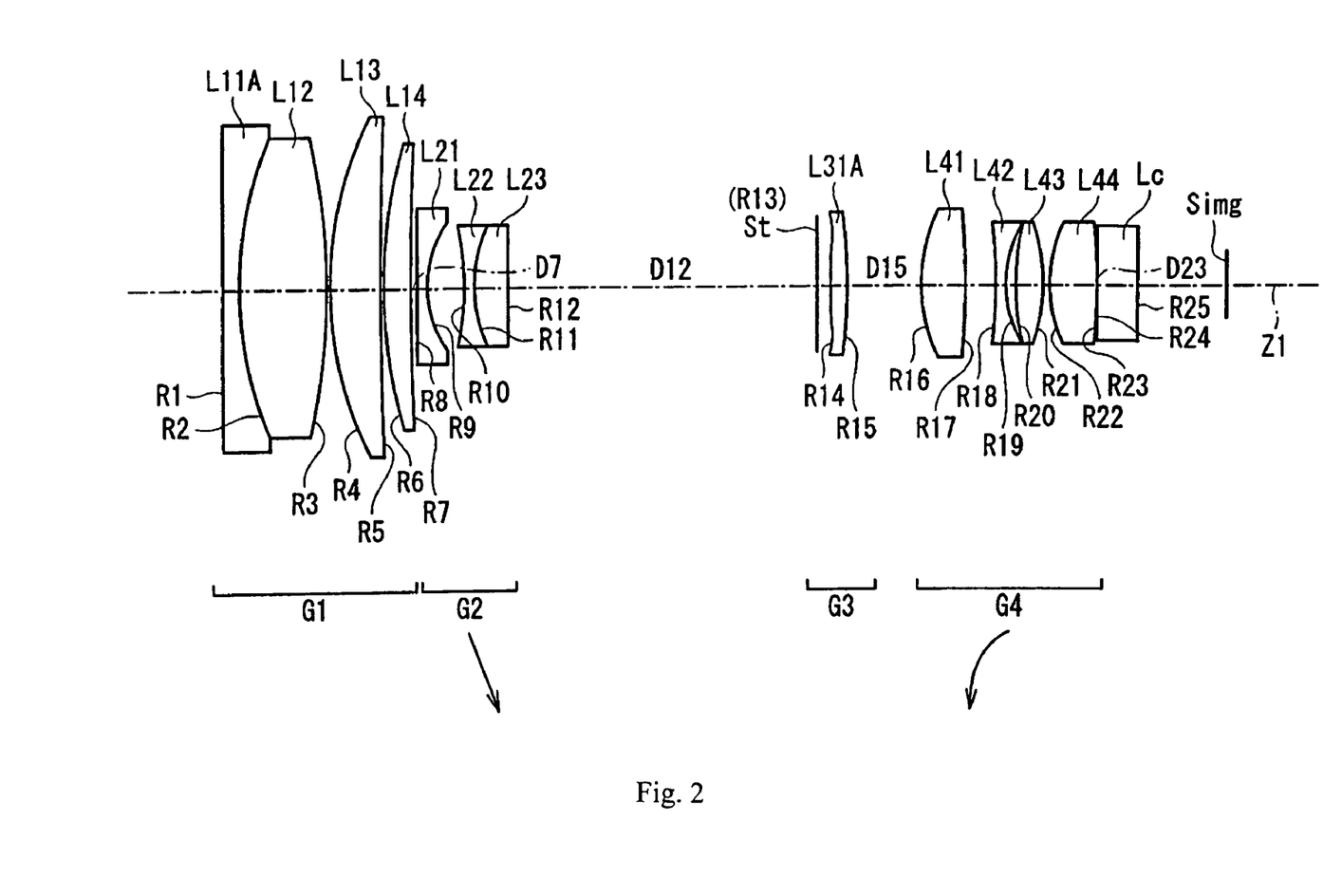
FIG. 2 shows a cross-sectional view of Embodiment 2 of the zoom lens of the present invention at the wide-angle end.

A general description of the four-group zoom lens of the present invention that pertains to the two embodiments of the invention will first be described primarily with reference to FIG. 1 that shows Embodiment 1. In FIG. 1, the four lens groups are labeled G1–G4 in order from the object side of the zoom lens and the lens components that belong to each lens group are indicated by brackets just above the labels G1–G4. Arrows below the labels G2 and G4 indicate the general direction of movement of these lens groups during zooming. Lens groups G1 and G3 remain stationary during zooming. The lens elements of the lens groups are referenced by the letter L followed by two digits denoting their order from the object side of the zoom lens along the optical axis Z1, from L11 to L14, from L21 to L23, from L31 to L32, and from L41 to L44. The first digit denotes the lens group and the second digit denotes the lens order from the object side of the zoom lens. In FIG. 2, the labels of the first lens elements of the first and third lens groups, G1 and G3 include an additional "A" related to differences between the embodiments of FIG. 1 and FIG. 2.

Radii of curvature of the surfaces of various optical elements, including the lens surfaces, are referenced by the letter R followed by a number denoting their order from the object side of the zoom lens, from R1 to R27 in FIG. 1 and from R1 to R25 in FIG. 2, with the numbering being consecutive but with some references omitted for clarity of illustration. The on-axis surface spacings along the optical axis Z1 of various optical surfaces are referenced by the letter D followed by a number denoting their order from the object side of the zoom lens, from D1 to D25 in FIG. 1 and from D1 to D23 in FIG. 2, with the numbering being consecutive but with some labels omitted for clarity of illustration.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is used herein to define an assembly of one or more lens components that are fixed or are movable as a single unit.

An image pickup device, such as a CCD (Charge Coupled Device) or CMOS (Complementary Metal Oxide Semiconductor) (not shown), is arranged at an image plane Simg. As shown in FIG. 1, a cover glass Lc is arranged between the fourth lens group G4 and the imaging plane Simg to protect the detecting surface of the image pickup device.

In order to improve imaging, lens surfaces may be aspheric. The lens surfaces that are aspheric satisfy the following equation:

$$Z = [(Y^2/R)/\{1+(1-K \cdot Y^2/R^2)^{1/2}\}] + A_4 Y^4 + A_6 Y^6 + A_8 Y^8 + A_{10} Y^{10} \qquad \text{(Equation A)}$$

where

Z is the length (in mm) of a line drawn from a point on the aspheric surface at a distance Y from the optical axis to the tangential plane of the aspheric surface vertex, R is the radius of curvature (in mm) of the aspheric surface at the optical axis, Y is the distance (in mm) from the optical axis, K is the eccentricity, and $A_4, A_6, A_8,$ and $A_{10}$ are the 4th, 6th, 8th, and 10th aspheric coefficients.

The zoom lens of the present invention is designed for use in both the visible light region and the near infrared region, and it may be mounted in a surveillance camera, or in a similar imaging system, for both day and night use.

As shown in FIG. 1, the four-group zoom lens of the present invention includes, in order from the object side, a first lens group G1 having positive refractive power, a second lens group G2 having negative refractive power, a third lens group G3 having positive refractive power, and a fourth lens group G4 having positive refractive power.

The four-group zoom lens is constructed so that the second lens group G2 and the fourth lens group G4 are moved along the optical axis Z1 during zooming. More specifically, zooming is performed by movement of the second lens group G2 along the optical axis and the correction of the variation in the image position along the optical axis is performed by movement of the fourth lens group G4 along the optical axis. The second lens group G2 and the fourth lens group G4 move as indicated by the arrows in FIG. 1 and FIG. 2 while zooming from the wide-angle end to the telephoto end. The first lens group G1 and the third lens group G3 do not move for zooming.

With the lens groups being, in order from the object side, positive, negative, positive, and positive, the light beam converged by the first lens group G1 is diverged by the second lens group G2, and it is then converged again by the third lens group G3 and the fourth lens group G4.

In the following descriptions, references will be frequently made to a "lens element." However, as set forth above, it is understood that numerous of the lens elements described below are also lens components and may be replaced by lens components that include more than one lens element.

The first lens group G1 includes, in order from the object side, a first lens element L11 having negative refractive power, a second lens element L12 having positive refractive power and a convex lens surface on the object side that is cemented to the first lens element, a third lens element L13 having positive refractive power and a convex lens surface on the object side, and a fourth lens element L14 having positive refractive power and a convex lens surface on the object side.

The first lens element L11 in the first lens group G1 may have a meniscus shape with its concave lens surface on the image side. Alternatively, the first lens element L11 may have a biconcave shape such as in the first lens Li 1A as shown in FIG. 2. The first lens element L11 and the second lens element L12 are cemented so as to form a doublet. The third lens element L13 has, for instance, a meniscus shape with its convex lens surface on the object side. The fourth lens element L14 has a meniscus shape with its convex lens surface on the object side.

In the first lens group G1, by making the first lens element L11 and the second lens element L12 into a cemented lens component, generation of the longitudinal chromatic aberration can be greatly suppressed. Further, by making the object side surfaces of the second lens element L12, the third lens element L13, and the fourth lens element L14 be convex, the generation of spherical aberration can be especially well suppressed.

Additionally, the first lens group G1 is constructed so as to satisfy the following Conditions (1)–(3):

$\nu_{d1} < 45$      Condition (1)

$N_{d2} < 1.52$      Condition (2)

$\nu_{d2} > 63$      Condition (3)

where $\nu_{d1}$ is the Abbe number of the first lens element of the first lens group at the d-line (587.6 nm), $N_{d2}$ is the refractive index $N_d$ of the second lens element of the first lens group at the d-line, and $\nu_{d2}$ is the Abbe number of the second lens element of the first lens group at the d-line.

Conditions (1)–(3) are conditions that limit the appropriate lens materials, generally the types of glass, that may be used for the first lens element L11 and the second lens element L12 in order to achieve good correction of chromatic aberrations. By satisfying Conditions (1)–(3), the appropriate lens material can be selected. Conditions (1)–(3) are especially important in favorably correcting longitudinal chromatic aberration in the visible light region and the near infrared region so that a zoom lens that is especially useful in both of these light regions can be produced.

The second lens group G2 includes, in order from the object side, a first lens element L21 having negative refractive power, a second lens element L22 having negative refractive power, and a third lens L23 having positive refractive power. The first lens element L21 and the second lens element L22 in the second lens group G2 may both be biconcave lens elements. The third lens element L23 may be a meniscus lens element with its convex lens surface on the object side. The second lens element L22 and the third lens element L23 may be cemented together to form a cemented lens component.

The third lens group G3 includes, in order from the object side, a first lens element L31 and a second lens element L32. Alternatively, the third lens group G3 can be formed of only a single lens element or a single lens component, as shown by the single lens element L31A in FIG. 2.

The fourth lens group G4 includes, in order from the object side, a first lens element L41 having positive refractive power and a convex lens surface on the object side, a second lens element L42 having a biconcave shape, a third lens element L43 having positive refractive power, and a fourth lens element L44 having positive refractive power.

Additionally, it is desirable that at least one lens surface of the lens surfaces of the lens elements of the third lens group G3 and the fourth lens group G4 be aspheric. For example, it is desirable that both lens surfaces of the lens element L31 of FIG. 1, or lens element L31A of FIG. 2, be aspheric. Further, for example, it is also desirable that both surfaces of lens element L44, which is on the image side of the fourth lens group G4, be aspheric.

The first lens element L31 of FIG. 1, or the lens element L31A of FIG. 2, in the third lens group G3 is, for example, an aspheric lens having positive refractive power and a convex lens surface near the optical axis on the object side. The second lens element L32, which is present only in FIG. 1 and not in FIG. 2, of the third lens group G3 is also, for example, a lens element having positive refractive power and a convex lens surface on the object side.

The first lens element L41 in the fourth lens group G4 has, for example, a biconvex shape. The second lens element L42 has, for example, a biconcave shape. The third lens element L43 has, for example, a biconvex shape. The fourth lens element L44 has, for example, a biconvex shape near the optical axis.

By using an aspheric lens surface as one or more of the lens surfaces of the lens elements of the third lens group G3 and the fourth lens group G4, correction of spherical aberration of the zoom lens is simplified, and it becomes easier to secure a bright image, corresponding to a small F number. In particular, when both lens surfaces of, for example, the fourth lens element L44 of the fourth lens group G4 are aspheric, spherical aberration may be well corrected.

Additionally, by the third lens group G3 including two lens elements, as shown in FIG. 1, it is easier to correct longitudinal chromatic aberration than with only one lens element, as shown in FIG. 2.

In the fourth lens group G4, by making the object side lens surface of the first lens element L41 convex, it becomes easier to suppress the generation of spherical aberration. Additionally, in the fourth lens group G4, by the second lens element L42 having a biconcave shape and the third lens element L43 having positive refractive power, the generation of lateral color becomes easier to suppress.

It is further desirable that this zoom lens be constructed so as to satisfy the following Condition (4):

$6 < f_1/f_w < 15$  Condition (4)

where $f_1$ is the composite focal length of the first lens group G1, and $f_w$ is the focal length of the entire four-group zoom lens at the wide-angle end.

By satisfying Condition (4), chromatic aberration can be well suppressed while allowing the lens system to be compact. If the ratio of Condition (4) exceeds the upper limit of Condition (4), it becomes necessary to reduce the positive power of the first lens group, which results in an undesirable increase in the overall length of the zoom lens. If the ratio of Condition (4) is less than the lower limit of Condition (4), the positive refractive power of the first lens group G1 has become too strong, making correction of chromatic aberration difficult.

In this manner, according to the zoom lens of the invention, by appropriately selecting the type of lens material, generally glass, so as to satisfy Conditions (1)–(3) in a four-group zoom lens having a positive, negative, positive, positive lens group arrangement in order from the object side, the longitudinal chromatic aberration of the zoom lens can be favorably corrected in the visible and near infrared regions. In addition, by satisfying Condition (4), the generation of chromatic aberrations can be further suppressed, as well as making it easier to make the zoom lens compact. Furthermore, by the first lens group G1 including four lens elements, in order from the object side, a first lens L11 having negative refractive power, a second lens L12 having positive refractive power and a convex lens surface on the object side, a third lens L13 having positive refractive power and a convex lens surface on the object side, and a fourth lens L14 having positive refractive power and a convex lens surface on the object side, a lens that provides a bright image and that has a high zoom ratio (for example, a zoom ratio of about ten to one) can be more easily realized.

Two embodiments of the present invention will now be described with reference to the drawings.

Embodiment 1

In Embodiment 1, as shown in FIG. 1, the third lens group G3 includes two lens elements L31 and L32 having positive refractive power.

Table 1 below lists the surface number #, in order from the object side, the radius of curvature R (in mm) of each surface near the optical axis, the on-axis surface spacing D (in mm), as well as the refractive index $N_d$ and the Abbe number $v_d$ at the d-line (587.6 mm) of each lens element for Embodiment 1.

TABLE 1

| # | R | D | $N_d$ | $v_d$ |
|---|---|---|---|---|
| 1 | 856.256 | 1.35 | 1.83400 | 37.2 ($v_{d1}$) |
| 2 | 33.873 | 8.49 | 1.43875 ($N_{d2}$) | 95.0 ($v_{d2}$) |
| 3 | −63.709 | 0.12 | | |
| 4 | 33.499 | 5.00 | 1.62041 | 60.3 |
| 5 | 223.511 | 0.20 | | |
| 6 | 50.757 | 2.78 | 1.51742 | 52.4 |
| 7 | 367.291 | D7 (variable) | | |
| 8 | −476.376 | 0.80 | 1.83400 | 37.2 |
| 9 | 9.057 | 3.42 | | |
| 10 | −22.812 | 0.84 | 1.51823 | 59.0 |
| 11 | 10.790 | 3.22 | 1.84666 | 23.8 |
| 12 | 62.554 | D12 (variable) | | |
| 13 | ∞ (stop) | 0.80 | | |
| 14* | 52.976 | 1.63 | 1.69350 | 53.2 |
| 15* | 682.019 | 0.20 | | |
| 16 | 23.771 | 2.10 | 1.51633 | 64.1 |
| 17 | 61.861 | D17 (variable) | | |
| 18 | 15.273 | 4.20 | 1.49700 | 81.6 |
| 19 | −51.085 | 2.71 | | |
| 20 | −40.536 | 0.99 | 1.75520 | 27.5 |
| 21 | 11.563 | 0.99 | | |
| 22 | 33.741 | 2.41 | 1.58913 | 61.2 |
| 23 | −19.009 | 0.69 | | |
| 24* | 14.480 | 4.17 | 1.57250 | 57.8 |
| 25* | −57.024 | D25 (variable) | | |
| 26 | ∞ | 4.00 | 1.51633 | 64.1 |
| 27 | ∞ | | | |

The lens surfaces with a * to the right of the surface number in Table 1 are aspheric, and the shape of these aspherical surfaces is defined using Equation (A) above.

Table 2 below lists the values of the constants K, $A_4$, $A_6$, $A_8$, and $A_{10}$ used in Equation (A) above for each of the aspherical surfaces indicated in Table 1. Aspheric coefficients that are not present in Table 2 are zero. An "E" in the data indicates that the number following the "E" is the exponent to the base 10. For example, "1.0E–02" represents the number $1.0 \times 10^{-2}$.

TABLE 2

| # | K | $A_4$ | $A_6$ | $A_8$ | $A_{10}$ |
|---|---|---|---|---|---|
| 14 | 0.981 | −0.1742168E−3 | −0.1931318E−5 | −0.7238758E−8 | −0.3412288E−9 |
| 15 | 1.001 | −0.1512030E−3 | −0.1528933E−5 | −0.1196156E−7 | −0.9456400E−10 |

TABLE 2-continued

| # | K | $A_4$ | $A_6$ | $A_8$ | $A_{10}$ |
|---|---|---|---|---|---|
| 24 | 0.968 | −0.1043340E−4 | −0.6251838E−6 | 0 | 0 |
| 25 | 0.983 | −0.5277589E−4 | −0.1097028E−5 | 0 | 0 |

In the zoom lens of Embodiment 1, the second lens group G2 and the fourth lens group G4 move during zooming. Therefore, the values of the on-axis spacings D7, D12, D 17, and D25 between the lens groups change with zooming. Table 3 below lists the values of the variables D7, D12, D17, and D25 (i.e, the group spacings), the f-number $F_{NO}$, and the maximum image angle 2ω at the wide-angle end (f=5.18 mm), at an intermediate focal length (f=27.34 mm), and at the telephoto end (f=49.50) for Embodiment 1.

TABLE 3

| f | D7 | D12 | D17 | D25 | $F_{NO}$ | 2ω |
|---|---|---|---|---|---|---|
| 5.18 | 0.65 | 29.24 | 4.49 | 0.00 | 1.45 | 63.5° |
| 27.34 | 23.29 | 6.60 | 1.13 | 3.36 | 1.55 | 12.39° |
| 49.50 | 28.67 | 1.22 | 3.41 | 1.08 | 1.89 | 6.82° |

The zoom lens of Embodiment 1 of the present invention satisfies Conditions (1)–(4) above as set forth in Table 4 below.

TABLE 4

| Condition No. | Condition | Value |
|---|---|---|
| (1) | $v_{d1} < 45$ | 37.2 |
| (2) | $N_{d2} < 1.52$ | 1.43875 |
| (3) | $v_{d2} > 63$ | 95 |
| (4) | $6 < f_1/f_w < 15$ | 8.61 |

Figure 3A:
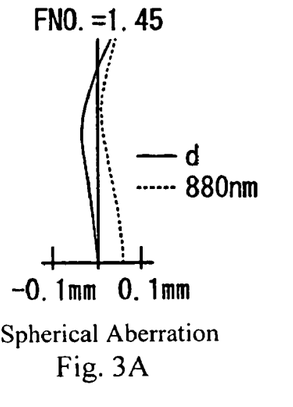
FIGS. 3A–3C show aberrations of Embodiment 1 of the zoom lens of the present invention at the wide-angle end.
Figure 3B:
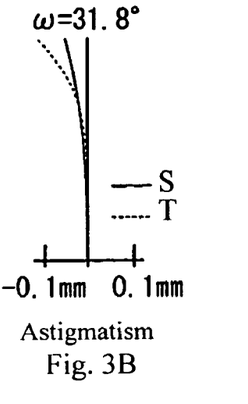
Figure 3C:
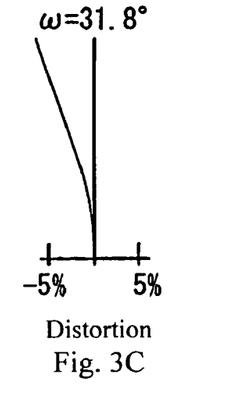
Figure 4A:
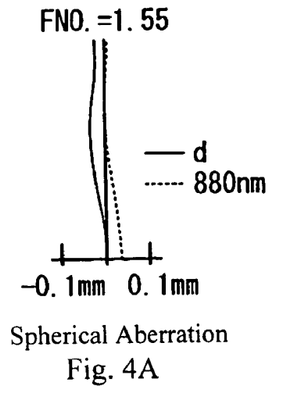
FIGS. 4A–4C show aberrations of Embodiment 1 of the zoom lens of the present invention at an intermediate position.
Figure 4B:
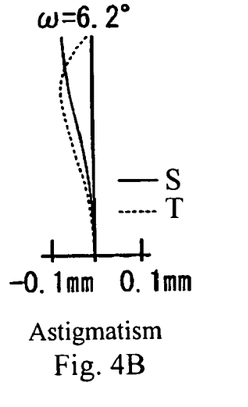
Figure 4C:
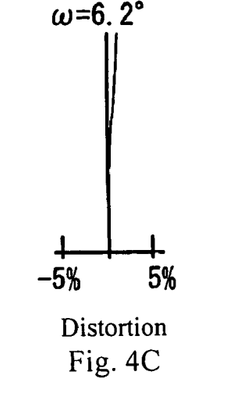
Figure 5A:
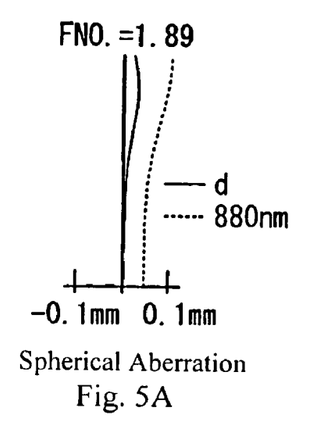
FIGS. 5A–5C show aberrations of Embodiment 1 of the zoom lens of the present invention at the telephoto end.
Figure 5B:
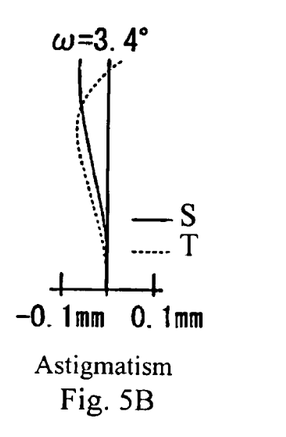
Figure 5C:
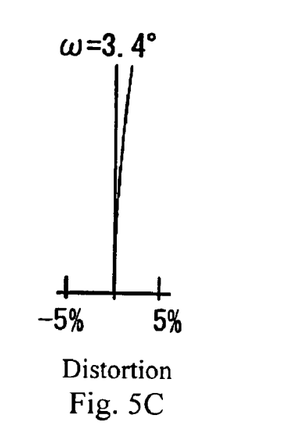

FIGS. 3A–3C show the spherical aberration, astigmatism, and distortion, respectively, of the zoom lens of Embodiment 1 at the wide-angle end. FIGS. 4A–4C show the spherical aberration, astigmatism, and distortion, respectively, of the zoom lens of Embodiment 1 at an intermediate position, and FIGS. 5A–5C show the spherical aberration, astigmatism, and distortion, respectively, of the zoom lens of Embodiment 1 at the telephoto end. In FIGS. 3A, 4A, and 5A, the spherical aberration is shown for the wavelengths 587.6 nm (the d-line) and 880 nm. In the remaining figures, ω is the half-image angle. In FIGS. 3B, 4B, and 5B, the astigmatism is shown for the sagittal image surface S and the tangential image surface T. In FIGS. 3C, 4C, and 5C, distortion is measured at 587.6 nm (the d-line). As is apparent from these figures, the various aberrations are favorably corrected over the entire zoom range.

Embodiment 2

Embodiment 2 is very similar to Embodiment 1 and therefore only the differences between Embodiment 2 and Embodiment 1 will be explained. Embodiment 2 has only one lens element, lens element L31A, in lens group G3, as shown in FIG. 2, rather than two lens elements, as in Embodiment 1. Additionally, the object side lens element of the first lens group G1, lens element L11A, is a biconcave lens element, rather than a meniscus lens element as in Embodiment 1. Embodiment 2 also differs from Embodiment 1 in its lens element configuration having different radii of curvature of the lens surfaces, different eccentricities and aspheric coefficients of the aspheric lens surfaces, some different optical element surface spacings, some different refractive indexes, and some different Abbe numbers of the materials of the lens elements.

Table 5 below lists the surface number #, in order from the object side, the radius of curvature R (in mm) of each surface near the optical axis, the on-axis surface spacing D (in mm), as well as the refractive index $N_d$ and the Abbe number $v_d$ at the d-line (587.6 nm) of each lens element for Embodiment 2.

TABLE 5

| # | R | D | $N_d$ | $v_d$ |
|---|---|---|---|---|
| 1 | −8125.10 | 1.35 | 1.83400 | 37.2 ($v_{d1}$) |
| 2 | 33.61 | 8.33 | 1.43875 ($N_{d2}$) | 95.0 ($v_{d2}$) |
| 3 | −57.37 | 0.12 | | |
| 4 | 32.90 | 4.87 | 1.62041 | 60.3 |
| 5 | 253.37 | 0.20 | | |
| 6 | 49.83 | 2.59 | 1.51742 | 52.4 |
| 7 | 338.71 | D7 (variable) | | |
| 8 | −383.86 | 0.80 | 1.83400 | 37.2 |
| 9 | 9.10 | 3.40 | | |
| 10 | −23.10 | 0.85 | 1.51823 | 59.0 |
| 11 | 10.83 | 3.08 | 1.84666 | 23.8 |
| 12 | 67.39 | D12 (variable) | | |
| 13 | ∞ (stop) | 0.80 | | |
| 14* | 33.16 | 1.86 | 1.69350 | 53.2 |
| 15* | −754.63 | D15 (variable) | | |
| 16 | 14.62 | 4.20 | 1.58913 | 61.2 |
| 17 | −63.93 | 2.74 | | |
| 18 | −54.28 | 0.99 | 1.80518 | 25.4 |
| 19 | 10.60 | 0.94 | | |
| 20 | 31.13 | 2.36 | 1.62041 | 60.3 |
| 21 | −19.88 | 0.75 | | |
| 22* | 13.55 | 4.21 | 1.57250 | 57.8 |
| 23* | −85.54 | D23 (variable) | | |
| 24 | ∞ | 4.00 | 1.51633 | 64.1 |
| 25 | ∞ | | | |

The lens surfaces with a * to the right of the surface number in Table 5 are aspheric, and the shape of these aspherical surfaces is defined using Equation (A) above.

Table 6 below lists the values of the constants K, $A_4$, $A_6$, $A_8$, and $A_{10}$ used in Equation (A) above for each of the aspherical surfaces indicated in Table 5. Aspheric coefficients that are not present in Table 6 are zero. An "E" in the data indicates that the number following the "E" is the exponent to the base 10. For example, "1.0E–02" represents the number $1.0 \times 10^{-2}$.

TABLE 6

| # | K | $A_4$ | $A_6$ | $A_8$ | $A_{10}$ |
|---|---|---|---|---|---|
| 14 | 0.9815810 | −0.1218316E−3 | −0.1957565E−5 | −0.7637551E−8 | −0.1069077E−8 |
| 15 | 1.0014184 | −0.1074279E−3 | −0.9034067E−6 | −0.4730818E−7 | −0.2125315E−9 |
| 22 | 0.9193354 | 0.6854133E−5 | 0.6563995E−7 | 0 | 0 |
| 23 | 0.9833396 | −0.6678519E−4 | −0.8487965E−6 | 0 | 0 |

In the zoom lens of Embodiment 2, the second lens group G2 and the fourth lens group G4 move during zooming. Therefore, the values of the on-axis spacings D7, D12, D15, and D23 between the lens groups change with zooming. Table 7 below lists the values of the variables D7, D12, D15, and D23 (i.e, the group spacings), the f-number $F_{NO}$, and the maximum image angle 2ω at the wide-angle end (f=5.18 mm), at an intermediate focal length (f=27.32 mm), and at the telephoto end (f=49.46) for Embodiment 2.

TABLE 7

| f | D7 | D12 | D15 | D23 | $F_{NO}$ | 2ω |
|---|---|---|---|---|---|---|
| 5.18 | 0.65 | 28.89 | 6.70 | 0.00 | 1.45 | 63.77° |
| 27.32 | 22.98 | 6.56 | 3.81 | 2.90 | 1.55 | 12.40° |
| 49.46 | 28.34 | 1.19 | 6.52 | 0.18 | 1.91 | 6.81° |

The zoom lens of Embodiment 2 of the present invention satisfies Conditions (1)–(4) above as set forth in Table 8 below.

TABLE 8

| Condition No. | Condition | Value |
|---|---|---|
| (1) | $v_{d1}$ < 45 | 37.2 |
| (2) | $N_{d2}$ < 1.52 | 1.43875 |
| (3) | $v_{d2}$ > 63 | 95 |
| (4) | 6 < $f_t/f_w$ < 15 | 8.38 |

Figure 6A:
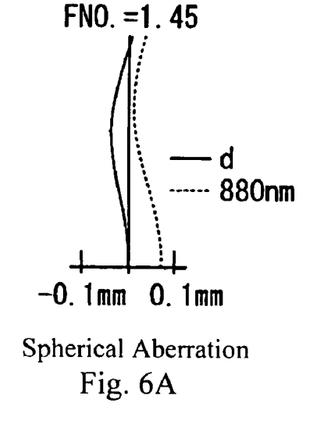
FIGS. 6A–6C show aberrations of Embodiment 2 of the zoom lens of the present invention at the wide-angle end.
Figure 6B:
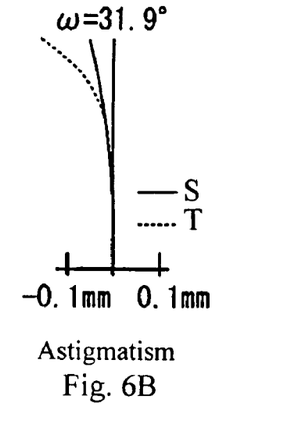
Figure 6C:
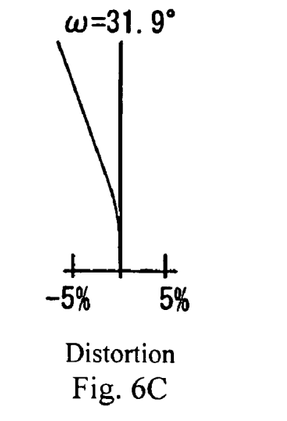
Figure 7A:
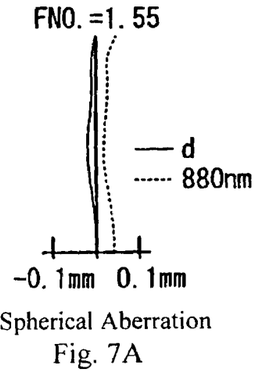
FIGS. 7A–7C show aberrations of Embodiment 2 of the zoom lens of the present invention at an intermediate position.
Figure 7B:
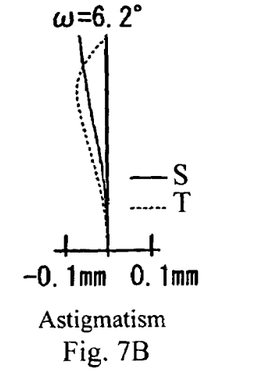
Figure 7C:
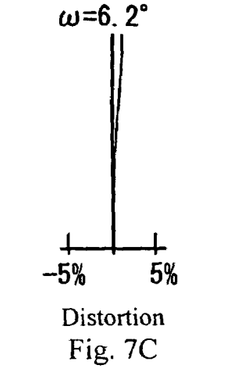
Figure 8A:
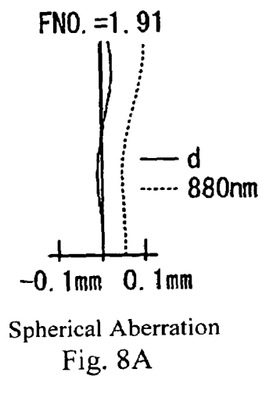
FIGS. 8A–8C show aberrations of Embodiment 2 of the zoom lens of the present invention at the telephoto end.
Figure 8B:
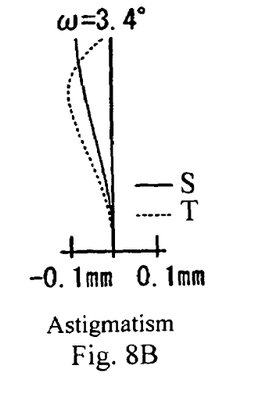
Figure 8C:
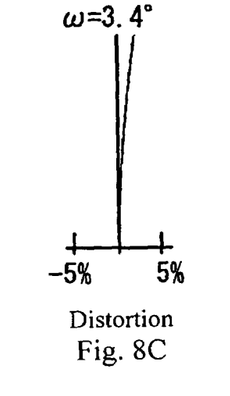

FIGS. 6A–6C show the spherical aberration, astigmatism, and distortion, respectively, of the zoom lens of Embodiment 2 at the wide-angle end. FIGS. 7A–7C show the spherical aberration, astigmatism, and distortion, respectively, of the zoom lens of Embodiment 2 at an intermediate position, and FIGS. 8A–8C show the spherical aberration, astigmatism, and distortion, respectively, of the zoom lens of Embodiment 2 at the telephoto end. In FIGS. 6A, 7A, and 8A, the spherical aberration is shown for the wavelengths 587.6 nm (the d-line) and 880 nm. In the remaining figures, ω is the half-image angle. In FIGS. 6B, 7B, and 8B, the astigmatism is shown for the sagittal image surface S and the tangential image surface T. In FIGS. 6C, 7C, and 8C, distortion is measured at 587.6 nm (the d-line). As is apparent from these figures, the various aberrations are favorably corrected over the entire zoom range.

As can be understood from the descriptions and tables considered with the above described figures, the zoom lenses of Embodiments 1 and 2 of the present invention realize a high zoom ratio of about ten to one while achieving high aberration correction in the visible and near infrared regions.

The present invention is not limited to the aforementioned embodiments, as it will be obvious that various alternative implementations are possible. For instance, values such as the radius of curvature R of each of the lens components, the surface spacings D, the refractive index N, as well as the Abbe number v, are not limited to the examples indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens formed of only four lens groups arranged along an optical axis, in order from the object side, as follows:
   a first lens group having positive refractive power;
   a second lens group having negative refractive power;
   a third lens group having positive refractive power; and
   a fourth lens group having positive refractive power;
wherein
   the first lens group and the third lens group do not move during zooming;
   the second and fourth lens groups are moved along the optical axis during zooming;
   the first lens group includes, in order from the object side, a first lens element having negative refractive power, a second lens element having positive refractive power and a convex lens surface on the object side that is cemented to the first lens element, a third lens element, and a fourth lens element having positive refractive power and a convex lens surface on the object side;
   the fourth lens group includes, in order from the object side, a first lens element having positive refractive power and a convex lens surface on the object side, a second lens element having a biconcave shape, a third lens element having positive refractive power, and a fourth lens element having positive refractive power; and
   the following conditions are satisfied:

$v_{d1}$<45

$N_{d2}$<1.52

$v_{d2}$>63 where
   $v_{d1}$ is the Abbe number of the first lens element of the first lens group at the d-line,
   $N_{d2}$ is the refractive index of the second lens element of the first lens group at the d-line, and
   $v_{d2}$ is the Abbe number of the second lens element of the first lens group at the d-line.

2. The zoom lens of claim 1, wherein the fourth lens group consists of the first lens element, the second lens element, the third lens element, and the fourth lens element.

3. The zoom lens of claim 1, wherein at least one of the lens surfaces of the lens elements of the third lens group and the fourth lens group is aspheric.

4. A zoom lens formed of only four lens groups arranged along an optical axis, in order from the object side, as follows:
   a first lens group having positive refractive power;
   a second lens group having negative refractive power;
   a third lens group having positive refractive power; and
   a fourth lens group having positive refractive power;
wherein
   the first lens group and the third lens group do not move during zooming;
   the second and fourth lens groups are moved along the optical axis during zooming;
   the first lens group includes, in order from the object side, a first lens element having negative refractive power, a second lens element having positive refractive power and a convex lens surface on the object side that is cemented to the first lens element, a third lens element, and a fourth lens element having positive refractive power and a convex lens surface on the object side;
   the first lens group consists of the first lens element, the second lens element, the third lens element, and the fourth lens element;
   the fourth lens group includes, in order from the object side, a first lens element having positive refractive power and a convex lens surface on the object side, a second lens element having a biconcave shape, a third lens element having positive refractive power, and a fourth lens element having positive refractive power; and
   the following conditions are satisfied;

$\nu_{d1} < 45$ $N_{d2} < 1.52$ $\nu_{d2} > 63$ where
   $\nu_{d1}$ is the Abbe number of the first lens element of the first lens group at the d-line,
   $N_{d2}$ is the refractive index of the second lens element of the first lens group at the d-line, and
   $\nu_{d2}$ is the Abbe number of the second lens element of the first lens group at the d-line.

5. The zoom lens of claim 4, wherein the fourth lens group consists of the first lens element, the second lens element, the third lens element, and the fourth lens element.

6. The zoom lens of claim 2, wherein at least one of the lens surfaces of the lens elements of the third lens group and the fourth lens group is aspheric.

7. A zoom lens formed of only four lens groups arranged along an optical axis, in order from the object side, as follows:
   a first lens group having positive refractive power;
   a second lens group having negative refractive power;
   a third lens group having positive refractive power; and
   a fourth lens group having positive refractive power;
wherein
   the first lens group and the third lens group do not move during zooming;
   the second and fourth lens groups are moved along the optical axis during zooming;
   the first lens group includes, in order from the object side, a first lens element having negative refractive power, a second lens element having positive refractive power and a convex lens surface on the object side that is cemented to the first lens element, a third lens element, and a fourth lens element having positive refractive power and a convex lens surface on the object side;
   the fourth lens group includes, in order from the object side, a first lens element having positive refractive power and a convex lens surface on the object side, a second lens element having a biconcave shape, a third lens element having positive refractive power, and a fourth lens element having positive refractive power; and
   the following conditions are satisfied;

$\nu_{d1} < 45$ $N_{d2} < 1.52$ $\nu_{d2} > 63$ $6 < f_I/f_w < 15$ where
   $\nu_{d1}$ is the Abbe number of the first lens element of the first lens group at the d-line,
   $N_{d2}$ is the refractive index of the second lens element of the first lens group at the d-line;
   $\nu_{d2}$ is the Abbe number of the second lens element of the first lens group at the d-line;
   $f_I$ is the composite focal length of the first lens group, and
   $f_w$ is the focal length of the entire four-group zoom lens at the wide-angle end.

8. The zoom lens of claim 7, wherein the fourth lens group consists of the first lens element, the second lens element, the third lens element, and the fourth lens element.

9. The zoom lens of claim 4, wherein at least one of the lens surfaces of the lens elements of the third lens group and the fourth lens group is aspheric.

10. A zoom lens formed of only four lens groups arranged along an optical axis, in order from the object side, as follows:
    a first lens group having positive refractive power;
    a second lens group having negative refractive power;
    a third lens group having positive refractive power; and
    a fourth lens group having positive refractive power;
wherein
    the first lens group and the third lens group do not move during zooming;
    the second and fourth lens groups are moved along the optical axis during zooming;
    the first lens group includes, in order from the object side, a first lens element having negative refractive power, a second lens element having positive refractive power and a convex lens surface on the object side that is cemented to the first lens element, a third lens element, and a fourth lens element having positive refractive power and a convex lens surface on the object side;
    the first lens group consists of the first lens element, the second lens element, the third lens element, and the fourth lens element;
    the fourth lens group includes, in order from the object side, a first lens element having positive refractive power and a convex lens surface on the object side, a second lens element having a biconcave shape, a third lens element having positive refractive power, and a fourth lens element having positive refractive power; and
    the following conditions are satisfied:

$\nu_{d1} < 45$ $N_{d2} < 1.52$ $$\nu_{d2} > 63$$

$$6 < f_I/f_w < 15$$

where $\nu_{d1}$ is the Abbe number of the first lens element of the first lens group at the d-line, $N_{d2}$ is the refractive index of the second lens element of the first lens group at the d-line, $\nu_{d2}$ is the Abbe number of the second lens element of the first lens group at the d-line, $f_I$ is the composite focal length of the first lens group, and $f_w$ is the focal length of the entire four-group zoom lens at the wide-angle end.

11. The zoom lens of claim 10, wherein the fourth lens group consists of the first lens element, the second lens element, the third lens element, and the fourth lens element.

12. The zoom lens of claim 5, wherein at least one of the lens surfaces of the lens elements of the third lens group and the fourth lens group is aspheric.

* * * * *

UNITED STATES PATENT AND TRADEMARK OFFICE
CERTIFICATE OF CORRECTION

PATENT NO. : 6,982,835 B2
DATED : January 3, 2006
INVENTOR(S) : Tomioka

It is certified that error appears in the above-identified patent and that said Letters Patent is hereby corrected as shown below:

Column 3,
Line 56, change "Li 1A" to -- L11A --.

Signed and Sealed this

Eighteenth Day of April, 2006

JON W. DUDAS
*Director of the United States Patent and Trademark Office*